(12) United States Patent
Kashiwa et al.

(10) Patent No.: US 7,592,403 B2
(45) Date of Patent: Sep. 22, 2009

(54) ETHYLENE POLYMER, PREPARATION PROCESS THEREOF AND MOLDED ARTICLES OF THE SAME

(75) Inventors: Norio Kashiwa, Sodegaura (JP); Shingo Matsuo, Sodegaura (JP); Shinichi Kojoh, Sodegaura (JP); Mamoru Takahashi, Sodegaura (JP)

(73) Assignee: Mitsui Chemicals, Inc., Minato-ku, Tokyo (JP)

( * ) Notice: Subject to any disclaimer, the term of this patent is extended or adjusted under 35 U.S.C. 154(b) by 102 days.

(21) Appl. No.: 11/196,307

(22) Filed: Aug. 4, 2005

(65) Prior Publication Data

US 2005/0267273 A1 Dec. 1, 2005

Related U.S. Application Data

(62) Division of application No. 10/066,599, filed on Feb. 6, 2002, now abandoned.

(30) Foreign Application Priority Data

Feb. 8, 2001 (JP) ............................ 2001-32913

(51) Int. Cl.
C08F 4/64 (2006.01)
C08F 4/76 (2006.01)
C08F 4/44 (2006.01)

(52) U.S. Cl. .................. 526/160; 526/170; 526/943; 526/941; 526/131; 526/134

(58) Field of Classification Search ................ 526/160, 526/134, 170, 943
See application file for complete search history.

(56) References Cited

U.S. PATENT DOCUMENTS

| | | | | |
|---|---|---|---|---|
| 5,015,511 A | * | 5/1991 | Treybig et al. | 428/34.1 |
| 5,198,401 A | * | 3/1993 | Turner et al. | 502/155 |
| 5,218,071 A | * | 6/1993 | Tsutsui et al. | 526/348 |
| 5,250,612 A | * | 10/1993 | Hazlitt et al. | 525/53 |
| 5,278,272 A | | 1/1994 | Lai et al. | |
| 5,519,091 A | | 5/1996 | Tsutsui et al. | |
| 5,527,752 A | | 6/1996 | Reichle et al. | |
| 5,639,842 A | | 6/1997 | Tsutsui et al. | |
| 5,674,945 A | | 10/1997 | Takahashi et al. | |
| 5,783,638 A | | 7/1998 | Lai et al. | |
| 5,874,513 A | | 2/1999 | Watanabe et al. | |
| 6,218,488 B1 | * | 4/2001 | Schiffino et al. | 526/133 |
| 6,242,545 B1 | * | 6/2001 | Jejelowo et al. | 526/160 |
| 6,300,433 B1 | * | 10/2001 | Rodriguez et al. | 526/127 |
| 6,313,240 B1 | * | 11/2001 | Hasegawa et al. | 526/133 |
| 6,333,387 B1 | | 12/2001 | Takahashi et al. | |
| 2002/0107343 A1 | | 8/2002 | Kashiwa et al. | |

FOREIGN PATENT DOCUMENTS

| | | |
|---|---|---|
| EP | 0 495 099 A1 | 7/1992 |
| EP | 0 612 768 A1 | 8/1994 |
| EP | 0 926 169 A1 | 6/1999 |
| EP | 0 955 321 A2 | 11/1999 |
| EP | 1 231 229 A2 | 8/2002 |
| JP | 2-276807 | 11/1990 |
| JP | 06-298824 A | 10/1994 |
| JP | 7-500622 | 1/1995 |
| JP | 07-188336 A | 7/1995 |
| JP | 9-151205 * | 6/1997 |
| JP | 09-151205 A | 6/1997 |
| JP | 9-309921 A | 12/1997 |
| JP | 11-106432 A | 4/1999 |
| WO | WO 96/07680 A1 | 3/1996 |
| WO | WO 96/34021 A1 | 10/1996 |
| WO | WO 00/24792 A1 | 5/2000 |
| WO | WO 01/05852 A1 * | 1/2001 |

OTHER PUBLICATIONS

JP 9-151205 (Jun. 1997) abstract and translation in English*

* cited by examiner

*Primary Examiner*—David Wu
*Assistant Examiner*—Rip A. Lee
(74) *Attorney, Agent, or Firm*—Buchanan Ingersoll & Rooney PC

(57) ABSTRACT

The present invention provides ethylene polymers capable of preparing various molded articles such as films, sheets or the like, and having excellent moldability, particularly excellent high-speed moldability.

The ethylene polymers of the present invention have a density and molecular weight distribution in specific ranges.

The first ethylene polymer is characterized by having (C) a ratio ($MFR_{10}/MFR_2$) of a melt flow rate ($MFR_{10}$) at 190° C. under a load of 10 Kg to a melt flow rate ($MFR_2$) at 190° C. under a load of 2.16 Kg of from 16.2 to 50. The second ethylene polymer is characterized by having (C) a ratio ($MFR_{10}/MFR_2$) from 12 to 50. The third ethylene polymer is characterized by having (D) a relation of $\omega2/\omega1 \geq 18$ where $\omega1$ and $\omega2$ denote angular velocity (rad/sec) when complex elastic modulus $G^*$ ($dyne/cm^2$) at 200° C. is $5.0 \times 10^5$ $dyne/cm^2$ and $2.0 \times 10^6$ $dyne/cm^2$, respectively, which are determined by measurement of the angular velocity dependence of the complex elastic modulus of the copolymer.

1 Claim, No Drawings

ETHYLENE POLYMER, PREPARATION PROCESS THEREOF AND MOLDED ARTICLES OF THE SAME

CROSS-REFERENCE TO RELATED APPLICATIONS

This application is a divisional of Application No. 10/066,599, filed Feb. 6, 2002, now abandoned, the contents of which are incorporated herein by reference, which in turn claims priority to Japanese Application No. 2001-32913, filed Feb. 8, 2001.

FIELD OF THE INVENTION

The present invention relates to a novel ethylene polymer, a preparation process thereof and molded articles prepared from the ethylene polymer. More particularly, it relates to an ethylene polymer having a density and molecular weight distribution (Mw/Mn) in specific ranges and excellent polymer fluidity, a preparation process thereof and molded articles prepared from the ethylene polymer.

BACKGROUND OF THE INVENTION

When an ethylene homopolymer and copolymers of ethylene and an α-olefin having 3 to 20 carbon atoms prepared by polymerization using a transition metal catalyst such as metallocene catalyst or Ziegler-Natta catalyst (hereinafter referred to as ethylene polymers) in the same density region as conventional high-pressure low density polyethylene are molded into a film or sheet, it has more excellent mechanical strength such as tensile strength, tear strength or impact strength, and further excellent heat resistance, stress and scratch properties, optical properties and heat sealing properties as compared with high-pressure low density polyethylene.

The ethylene copolymers, however, have such a problem in that the fluidity represented by a ratio ($MFR_{10}/MFR_2$) of a melt flow rate ($MFR_{10}$) under a load of 10 Kg at 190° C. to a melt flow rate ($MFR_2$) under a load of 2.16 Kg at 190° C. is lower than that of conventional high-pressure low density polyethylene, and the moldability is not sufficient.

On this account, if ethylene polymers which have a high $MFR_{10}/MFR_2$ value and excellent fluidity at the same density region as conventional high pressure low density polyethylene can be prepared by polymerization with the transition metal catalyst, its industrial value will be very high.

At present, it is impossible for the high-pressure method to prepare low-density polyethylene having a Mw/Mn of lower than 4.0. The polymers having a lower Mw/Mn have high homogeneity and show that, after polymer molding, blocking or appearance failure is hardly induced. Accordingly, the production of low-density polyethylene having a Mw/Mn ratio of lower than 4.0 and a high $MFR_{10}/MFR_2$ ratio like the high-pressure low-density polyethylene at the same density region as high-pressure low-density polyethylene (0.921 to 0.929 g/cm³) has been desired.

Further, ethylene polymers in the lower density region than that of conventional high-pressure low-density polyethylene are useful as a modifier or compatibilizing agent, but it is impossible for the ethylene polymer in this density region to improve the fluidity by increasing the $MFR_{10}/MFR_2$ ratio thereof.

The method of increasing the $MFR_{10}/MFR_2$ ratio by increasing the Mw/Mn value is known generally. The method, however, has such a problem that increasing the Mw/Mn value to more than 11 lowers the homogeneity of the polymer, thereby resulting in occurrence of blocking or appearance failure. On this account, it is desired that the Mw/Mn value be less than 10. However, it is very difficult for the ethylene polymers in the region of the Mw/Mn value of less than 10 to increase the $MFR_{10}/MFR_2$ ratio until the same region of high-pressure low-density polyethylene (the $MFR_{10}/MFR_2$ ratio being from 16.2 to 50).

Furthermore, ethylene polymers in the higher density region than that of conventional high-pressure low-density polyethylene are molded into vessels or films and then used suitably. However, ethylene polymers having the same fluidity as that of conventional high-pressure low-density polyethylene cannot be prepared.

In the light of the foregoing background, the preparation of ethylene polymers having a high $MFR_{10}/MFR_2$ ratio and excellent fluidity by polymerization with the transition metal catalyst has been studied.

JP-A-2-276807/1990 discloses that copolymerization of ethylene and an α-olefin of 3 to 20 carbon atoms in the presence of an olefin polymerization catalyst comprising a specific hafnium compound and organic aluminum oxy compound produces ethylene copolymers having the $MFR_{10}/MFR_2$ ratio increased until that of conventional high-pressure low-density polyethylene in the lower density region than that of conventional high-pressure low-density polyethylene, even if the Mw/Mn value is less than 10.

The present inventors found that the use of an organic boron compound with a specific organic hafnium compound in place of the organic aluminum oxy compound is more effective in preparation of ethylene polymers in the lower density region than that of conventionally high-pressure low-density polyethylene. Thus, the preparation process of the present invention has been accomplished.

Further, the preparation of, at the higher density region than that of conventional high-pressure low-density polyethylene, ethylene polymers having the $MFR_{10}/MFR_2$ ratio increased to that of conventional high-pressure low-density polyethylene has been desired. For increasing the $MFR_{10}/MFR_2$ ratio with keeping Mw/Mn of less than 10, it is generally known that it is effective to introduce a long chain branch into a polymer main chain. In this case, introduction of the long chain branch into the polymer main chain lowers the density of the ethylene polymer, so that this procedure is effective only in the low density region as described in JP-A-2-276807/1990 and it is difficult to apply this procedure in the high density region. JP-A-7-500622/1995 discloses that a $MFR_{10}/MFR_2$ ratio is increased even in a higher density region than that of conventional high-pressure low-density polyethylene with keeping Mw/Mn of less than 10 by the combined use of an organic boron compound and a specific organic titanium compound. Though the $MFR_{10}/MFR_2$ ratio is increased, it does not reach to the same level ($MFR_{10}/MFR_2$ ratio in the region of 16.2 to 50) as that of conventional high-pressure low-density polyethylene. Further, JP-A-7-500622/1995 discloses that the preparation of an ethylene polymer in the high density region is more difficult than that of an ethylene polymer in the low density region. In the examples thereof, an ethylene polymer having a high density as described above is prepared by carrying out polymerization at a higher temperature. That is, in the examples of JP-A-7-500622/1995, polymerization is carried out at 200° C. which is much higher than usual polymerization temperatures in order to increase the $MFR_{10}/MFR_2$ ratio to 16.1.

The present inventors found an ethylene polymer which $MFR_{10}/MFR_2$ ratio has been increased to the same extent ($MFR_{10}/MFR_2$ ratio in the range of 16.2 to 50) of conventional high-pressure low-density polyethylene with keeping Mw/Mn of lower than 10 in the higher density region than that of conventional high-pressure low-density polyethylene. Thus, the first ethylene polymer of the present invention has been accomplished.

The preparation of an ethylene polymer which $MFR_{10}/MFR_2$ ratio has been increased to the same as that of conventional high-pressure low-density polyethylene with keeping the Mw/Mn of less than 4.0 in the same density region as conventional high-pressure low-density polyethylene (0.921 to 0.929 g/cm$^3$) has been desired. JP-A-7-500622 discloses that a $MFR_{10}/MFR_2$ ratio is increased in the same density region than that of conventional high-pressure low-density polyethylene with keeping the Mw/Mn of less than 4.0 by the combined use of an organic boron compound and a specific organic titanium compound. However, a polyethylene having a $MFR_{10}/MFR_2$ value of higher than 10.6 still is not prepared.

The present inventors found an ethylene polymer which $MFR_{10}/MFR_2$ ratio has been increased to the value including the value of the $MFR_{10}/MFR_2$ ratio of conventional high-pressure low-density polyethylene with keeping the Mw/Mn of lower than 4.0 even in the higher density region than that of conventional high-pressure low-density polyethylene. Thus, the second ethylene polymer of the present invention has been accomplished.

Further, conventional ethylene polymers have been desired to be more improved on their high-speed moldability. The present inventors found an ethylene polymer having more excellent high-speed moldability than that of conventional ethylene polymers. Thus, the present invention has been accomplished.

Moreover, the present inventors found the combined use of the organic boron compound and a specific hafnium compound in place of an organic aluminum oxy compound is more effective in preparation of an ethylene polymer having excellent high-speed moldability. Thus, the present invention has been accomplished.

The present inventors, further, have accomplished the invention of molded articles prepared by using the ethylene polymers.

OBJECT OF THE INVENTION

The present invention is intended to solve the problems associated with the prior art as mentioned above.

It is an object of the invention to provide an ethylene polymer having, when it is molded into various molded articles such as films or sheets, properties of ethylene polymers prepared by using transition metal catalyst polymerization, for example, excellent mechanical strength such as tensile strength, tear strength and impact strength, heat resistance, stress crack properties, optical properties and heat sealing properties, and also having a high $MFR_{10}/MFR_2$ ratio and excellent fluidity. It is a further object of the invention to provide a process for preparation thereof and molded articles prepared therefrom.

It is a furthermore object of the invention to provide an ethylene polymer having, when it is molded into various molded articles such as films or sheets, properties of ethylene polymers prepared by polymerization using a transition metal compound catalyst, for example, excellent mechanical strength such as tensile strength, tear strength and impact strength, heat resistance, stress crack properties, optical properties and heat sealing properties, and also, particularly, having excellent fluidity under high-speed molding conditions. It is a further object of the invention to provide molded articles prepared therefrom.

SUMMARY OF THE INVENTION

The first ethylene polymer of the present invention has:
(A) a density of from 0.930 to 0.970 g/cm$^3$,
(B) a ratio (Mw/Mn) of a weight average molecular weight (Mw) to a number average molecular weight (Mn), as measured by GPC, of from 1.2 to 10, and
(C) a ratio ($MFR_{10}/MFR_2$) of a melt flow rate ($MFR_{10}$) at 190° C. under a load of 10 Kg to a melt flow rate ($MFR_2$) at 190° C. under a load of 2.16 Kg of from 16.2 to 50.

The second ethylene polymer of the invention has:
(A) a density of 0.921 g/cm$^3$ or more but less than 0.930 g/cm$^3$,
(B) a ratio (Mw/Mn) of a weight average molecular weight (Mw) to a number average molecular weight (Mn), as measured by GPC, of from 1.2 to 4.0, and
(C) a ratio ($MFR_{10}/MFR_2$) of a melt flow rate ($MFR_{10}$) at 190° C. under a load of 10 Kg to a melt flow rate ($MFR_2$) at 190° C. under a load of 2.16 Kg of from 12 to 50.

The third ethylene polymer of the invention has:
(A) a density of from 0.850 to 0.970 g/cm$^3$,
(B) a ratio (Mw/Mn) of a weight average molecular weight (Mw) to a number average molecular weight (Mn), as measured by GPC, of from 1.2 to 10, and
(D) a relation of $\omega 2/\omega 1 \geq 18$ where $\omega 1$ and $\omega 2$ denote angular velocity (rad/sec) when complex elastic modulus G*(dyne/cm$^2$) at 200° C. is 5.0×10 dyne/cm$^2$ and 2.0×10$^6$ dyne/cm$^2$, respectively, which are determined by measurement of the angular velocity dependence of the complex elastic modulus of the copolymer.

The first process for preparing an ethylene polymer according to the present invention comprises preparing an ethylene polymer in the presence of an olefin polymerization catalyst comprising an organic hafnium compound having at least one substituted cyclopentadienyl group and an organic boron compound essentially, wherein the ethylene polymer has:
(A) a density of from 0.850 to 0.970 g/cm$^3$,
(B) a ratio (Mw/Mn) of a weight average molecular weight (Mw) to a number average molecular weight (Mn), as measured by GPC, of from 1.2 to 10, and
(C) a ratio ($MFR_{10}/MFR_2$) of a melt flow rate ($MFR_{10}$) at 190° C. under a load of 10 Kg to a melt flow rate ($MFR_2$) at 190° C. under a load of 2.16 Kg of from 12 to 50.

The second process for preparing an ethylene polymer according to the present invention comprises preparing an ethylene polymer in the presence of an olefin polynmerization catalyst comprising an organic hafnium compound having at least one substituted cyclopentadienyl group and an organic boron compound essentially, wherein the ethylene polymer has:
(A) a density of from 0.850 to 0.970 g/cm$^3$,
(B) a ratio (Mw/Mn) of a weight average molecular weight (Mw) to a number average molecular weight (Mn), as measured by GPC, of from 1.2 to 10, and
(D) a relation of $\omega 2/\omega 1 \geq 13$ where $\omega 1$ and $\omega 2$ denote angular velocity (rad/sec) when complex elastic modulus G* (dyne/cm$^2$) at 200° C. is 5.0×10$^5$ dyne/cm$^2$ and 2.0×10 dyne/cm$^2$, respectively, which are determined by measurement of the angular velocity dependence of the complex elastic modulus of the copolymer.

The molded articles are selected from the group consisting of (a) injection molded articles, (b) hollow or extrusion molded articles, (c) rotational molded articles, (d) film or sheet molded articles and (e) extrusion coating molded articles, and comprise, as an essential component, any one of the first to third ethylene polymers or ethylene polymers prepared using the first or second preparation process (hereinafter, sometimes referred to as ethylene polymers of the present invention simply).

DETAILED DESCRIPTION OF THE INVENTION

The ethylene polymers, preparation processes thereof and molded articles prepared using the polymers according to the present invention are described in detail hereinafter.

The first to third ethylene polymers according to the invention and the ethylene polymers prepared by the first and second preparation processes are sometimes referred to as "ethylene polymers of the present invention".

The ethylene polymers of the present invention are an ethylene homopolymer or a random copolymer of ethylene and an α-olefin of 3 to 20 carbon atoms. When the ethylene polymers are random copolymers of ethylene and an α-olefin of 3 to 20 carbon atoms, usable examples of α-olefin of 3 to 20 carbon atoms may include propylene, 1-butene, 1-pentene, 1-hexene, 4-methyl-1-pentene, 1-octene, 1-decene, 1-dodecene, 1-tetradecene, 1-hexadecene, 1-octadecene and 1-eicocene. Among them, α-olefins of 3 to 15 carbon atoms are preferred, α-olefins of 4 to 12 carbon atoms are more preferred, and α-olefins of 6 to 10 carbon atoms are further preferred. The ethylene polymer has an α-olefin content of preferably less than 10 mol %, more preferably less than 8 mol % and further preferably less than 6 mol %. The content of α-olefin is generally determined by homogeneously dissolving about 200 mg of a copolymer in 1 ml of hexachlorobutadiene in a 100 mmφ test tube to prepare a specimen and measuring the $^{13}$C-NMR spectrum of the specimen under measuring conditions of a measuring temperature of 120° C., a measuring frequency of 25.05 MHz, a spectrum width of 1500 Hz, a pulse repetition time of 4.2 sec and a pulse width of 6 μsec.

The ethylene polymer of the present invention desirably has an intrinsic viscosity [η], as measured in decalin at 135° C., of preferably 0.5 to 20 dl/g, more preferably 0.6 to 15 dl/g.

The first ethylene polymer of the present invention further has the following properties in addition to the above-described properties.

The first ethylene polymer of the present invention has (A) a density of from 0.930 to 0.970 g/cm$^3$, preferably, 0.935 to 0.965 g/cm$^3$, more preferably 0.940 to 0.960 g/cm$^3$. The density is determined using a strand obtained in melt flow rate measurement at 190° C. under a load of 2.16 Kg by a density gradient tube.

The first ethylene polymer of the invention, further, has (B) a molecular weight distribution (Mw/Mn), as determined by a gel permeation chromatography (GPC), of from 1.2 to 10, preferably 1.4 to 8, more preferably 1.5 to 4. In the present invention, it is preferred to control the molecular weight distribution in a wide range. Further, it is more preferred to prepare an ethylene polymer having a narrow molecular weight distribution from the standpoint of the preparation of an ethylene polymer having high homogeneity. The Mw/Mn value is determined in the following manner in accordance with "Gel permeation chromatography" written by Takeuchi, published by Maruzen Co.

(1) Standard polystyrene having a known molecular weight (mono-dispersed polystyrene manufactured by Toyo Soda Co.) is used and the molecular weight M and the GPC (Gel Permeation Chromatograph) count are measured to make a correlation diagram calibration curve of the molecular weight M and EV (Elution Volume). The concentration at this time is 0.02 wt %.

(2) GPC chromatography of the specimen is determined by GPC measurement, and the number average molecular weight and weight average molecular weight in terms of polystyrene are calculated by the process (1). Further, applying to the empirical formula of conventionally known ethylene polymers, the number average molecular weight Mn and the weight average molecular weight Mw in terms of polyethylene are calculated to determine the Mw/Mn value. In this procedure, the sample preparation conditions and GPC measuring conditions are as follows.

[Sample Preparation]
(a) The sample is dispersed in an amount of 0.1 wt % with an o-dichlorobenzene solvent in an erlenmeyer flask.
(b) The erlenmeyer flask was heated to 140° C. and the dispersed solution is stirred for about 30 min to dissolve.
(c) The solution is subjected to GPC.

[GPC Measuring Conditions]
The GPC measurement is conducted in the following conditions. (a) Apparatus: 150C-ALC/GPC manufactured by Waters Co. (b) Column: GMH type manufactured by Toyo Soda Co. (c) Sample amount: 400 μl (d) Temperature: 140° C. (e) Flow velocity: 1 ml/min.

The first ethylene polymer of the invention has (C) a ratio (MFR$_{10}$/MFR$_2$) of a melt flow rate (MFR$_{10}$) at 190° C. under a load of 10 Kg to a melt flow rate (MFR$_2$) at 190° C. under a load of 2.16 Kg of from 16.2 to 50, preferably 16.3 to 45, more preferably 16.4 to 43, further preferably 16.5 to 40, most preferably 16.6 to 35.

The MFR$_{10}$/MFR$_2$ ratio is a numerical value of dividing the MFR$_{10}$ value by the MFR$_2$ value. The MFR$_{10}$ value is measured at 190° C. under a load of 10 Kg in accordance with ASTM D 1238-89. The MFR$_2$ value is measured at 190° C. under a load of 2.16 Kg in accordance with ASTM D 1238-89. The MFR$_2$ value is in range of preferably from 0.01 to 100 g/10 min, more preferably 0.015 to 50 g/10 min, most preferably 0.02 to 30 g/10 min.

The ethylene polymer having such a MFR$_{10}$/MFR$_2$ ratio of from 16.2 to 50 has extremely good fluidity in melting polymers.

To the contrary, conventionally known ethylene polymers having a density of from 0.930 to 0.970 g/cm$^3$ has a MFR$_{10}$/MFR$_2$ ratio of from 4 to 16.1, and has low fluidity in melting polymers.

The first ethylene polymer of the invention as described above has a high density, a high MFR$_{10}$/MFR$_2$ ratio and excellent moldability in melting polymer.

The second ethylene polymer of the invention has (A) a density of 0.921 g/cm$^3$ or more but less than 0.930 g/cm$^3$, preferably 0.921 to 0.929 g/cm$^3$, more preferably 0.922 to 0.928 g/cm$^3$.

The second ethylene polymer has (B) a ratio (Mw/Mn) of a weight average molecular weight (Mw) to a number average molecular weight (Mn), as measured by GPC, of from 1.2 to 4.0, preferably 1.3 to 3.8, further preferably 1.4 to 3.5, and (C) a ratio (MFR$_{10}$/MFR$_2$) of a melt flow rate (MFR$_{10}$) at 190° C. under a load of 10 Kg to a melt flow rate (MFR$_2$) at 190° C. under a load of 2.16 Kg of from 12 to 50, preferably 13 to 45, more preferably 14 to 43, further preferably 15 to 40, most preferably 16 to 35.

The MFR$_2$ value thereof is in range of preferably from 0.01 to 100 g/10 min, more preferably 0.015 to 50 g/10 min, most preferably 0.02 to 30 g/10 min.

The first and second ethylene polymers of the present invention desirably have a relation ω2/ω1 of not less than 18, preferably not less than 20 where ω1 and ω2 denote angular velocity (rad/sec) when complex elastic modulus G*(dyne/ cm$^2$) at 200° C. is 5.0×10$^5$ dyne/cm$^2$ and 2.0×10$^6$ dyne/cm$^2$, respectively. Particularly, the first and second ethylene polymers having a relation ω2/ω1 in these ranges have excellent flow properties under high-speed molding conditions. The measurement process will be described later.

The third ethylene polymer of the present invention has (A) a density of from 0.850 g/cm$^3$ to 0.970 g/cm$^3$. A preferred embodiment thereof has a density of 0.930 g/cm$^3$ or more but less than 0.970 g/cm$^3$, preferably 0.935 g/cm$^3$ to 0.965 g/cm$^3$, more preferably. 0.940 g/cm$^3$ to 0.960 g/cm$^3$. Another preferred embodiment thereof has a density of 0.921 g/cm$^3$ or more but less than 0.930 g/cm$^3$, preferably 0.921 g/cm$^3$ to 0.929 g/cm$^3$, more preferably 0.922 g/cm$^3$ to 0.928 g/cm$^3$. Further, other preferred embodiment thereof has a density of from 0.850 g/cm$^3$ to 0.920 g/cm$^3$, preferably 0.855 g/cm$^3$ to 0.915 g/cm$^3$, more preferably 0.860 g/cm$^3$ to 0.910 g/cm$^3$.

The third ethylene polymer of the invention, further, has (B) a ratio (Mw/Mn) of a weight average molecular weight (Mw) to a number average molecular weight (Mn), as measured by gel permeation chromatography (GPC), of from 1.2 to 10, preferably 1.2 to 8, more preferably 1.2 to 4.

The third ethylene polymer has (D) a ω2/ω1 ratio of not less than 18, preferably not less than 20 where ω1 and ω2 denote angular velocity (rad/sec) when complex elastic modulus G*(dyne/cm$^2$) at 200° C. is 5.0×10$^5$ dyne/cm$^2$ and 2.0×10$^6$ dyne/cm$^2$, respectively, which are determined by measurement of the angular velocity dependence of the complex elastic modulus of the copolymer. The upper limit thereof is not particularly determined, and preferably less than 60.

The ω2/ω1 ratio denotes a gradient of a flow curve at a higher shear rate (under shear stress) than MFR$_{10}$/MFR$_2$. Particularly, the ethylene polymer having a high ω2/ω1 ratio has excellent flow properties under high-speed molding conditions.

The ω2/ω1 ratio was determined as follows.

Using Rheometer RDS-II™ (manufactured by Rheometric Co.), a dispersion of an angular velocity (ω(rad/sec)) of a complex elastic modulus (G'(dyne/cm$^2$)) is measured. A 25 mmØ parallel plate is used as a sample holder and a sample thickness is about 2 mm. A high-temperature zone in a measuring part is replaced with nitrogen. The measuring temperature is set to 200° C., and the complex elastic modulus (G*(dyne/cm$^2$)) is measured in the range of 0.04≦ω≦400. The data is employed on 5 points per one order. When G* is 5.0×10$^5$ dyne/cm$^2$, the angular velocity (ω(rad/sec)) is taken as ω1, and when G* is 2.0×10$^6$ dyne/cm$^2$, the angular velocity (ω(rad/sec)) is taken as ω2, and then ω2/ω1 is determined.

It is considered that even if measuring at an angular velocity ω of 400 rad/sec, the value ω2/ω1 will be not determined occasionally according to a molecular weight, because G* is less than 2.0×10$^6$ dyne/cm$^2$. In this case, the measurement is conducted by decreasing the measuring temperature. When the measurement is conducted at a temperature of less than 150° C., sample is heated to 150° C. to completely melt crystals, and thereafter temperature is set to measuring temperature.

To the contrary, it is considered that even if measuring at an angular velocity ω of 0.04 rad/sec, the ω2/ω1 ratio will be not determined occasionally because G* is not less than 5.0×10$^5$ dyne/cm$^2$. In this case, the measurement is conducted by elevating the measuring temperature. The data (ω-G curve) measured at a temperature of excluding 200° C. is shifted parallel in an abscissa (ω) direction in accordance with time-temperature conversion rule until it is in contact with the end of the ω-G curve of the data group measured at 200° C. to obtain a resultant curve and then the ω2/ω1 ratio is determined from the resultant curve.

The distortion is selected in the range of from 2 to 25% so that the torque is detectable in the measuring range where the torque is not over-loaded. The ω2/ω1 ratio is read from a chart.

The third ethylene copolymer, further desirably, has a MFR (MFR$_2$) under a load of 2.16 Kg of from 0.01 to 100 g/10 min, preferably 0.015 to 50 g/10 min, especially 0.02 to 30 g/10 min.

Examples of the third ethylene polymer may include a polymer having a density of from 0.930 g/cm$^3$ to 0.970 g/cm$^3$, a Mw/Mn of from 1.2 to 10, preferably 1.2 to 8, more preferably 1.2 to 4 and a ω2/ω1 value of not less than 18;

a polymer having a density of 0.921 g/cm$^3$ or more but less than 0.930 g/cm$^3$, a Mw/Mn of from 1.2 to 4.0, preferably 1.3 to 3.8, more preferably 1.4 to 3.5 and a ω2/ω1 value of not less than 18; and a polymer having a density of from 0.850 g/cm$^3$ to 0.920 g/cm$^3$, a Mw/Mn of from 1.2 to 10, preferably 1.2 to 8, more preferably 1.2 to 4 and a ω2/ω1 value of not less than 18.

The first to third ethylene polymers are prepared by controlling the density of a resulting polymer with the first or second preparation process as described below.

The first process for preparing the ethylene polymer according to the present invention comprises conducting in the presence of an olefin polymerization catalyst comprising an organic hafnium compound having at least one substituted cyclopentadienyl group and an organic boron compound essentially, to prepare the ethylene polymer having:

(A) a density of from 0.850 to 0.970 g/cm$^3$, (B) a ratio (Mw/Mn) of a weight average molecular weight (Mw) to a number average molecular weight (Mn), as measured by GPC, of from 1.2 to 10, and (C) a ratio (MFR$_{10}$/MFR$_2$) of a melt flow rate (MFR$_{10}$) at 190° C. under a load of 10 Kg to a melt flow rate (MFR$_2$) at 190° C. under a load of 2.16 Kg of from 12 to 50.

The second process for preparing the ethylene polymer according to the present invention comprises conducting in the presence of an olefin polymerization catalyst comprising an organic hafnium compound having at least one substituted cyclopentadienyl group and an organic boron compound essentially, to prepare the ethylene polymer having:

(A) a density of from 0.850 to 0.970 g/cm$^3$, (B) a ratio (Mw/Mn) of a weight average molecular weight (Mw) to a number average molecular weight (Mn), as measured by GPC, of from 1.2 to 10, and (D) a relation of ω2/ω1≧13, preferably ω2/ω1≧18 where ω1 and ω2 denote angular velocity (rad/sec) when complex elastic modulus G*(dyne/cm$^2$) at 200° C. is 5.0×10$^5$ dyne/cm$^2$ and 2.0×10$^6$ dyne/cm$^2$, respectively, which are determined by measurement of the angular velocity dependence of the complex elastic modulus of the copolymer.

In the first place, the organic hafnium compound is described in detail.

The substituted cyclopentadienyl group in the organic hafnium compound having at least one substituted cyclopentadienyl group is a group in which at least one hydrogen is substituted with other groups. The organic hafnium compound preferably has the structure of any one of the following formula (1) to (3), most preferably the structure of the formula (2).

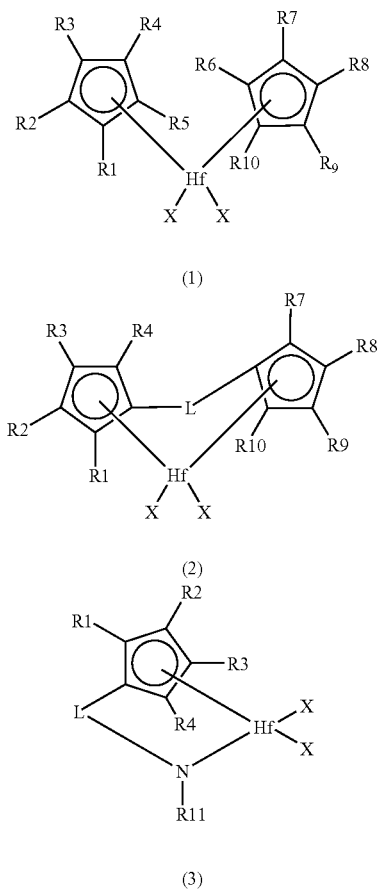

(1)

(2)

(3)

In the formulas, L is a crosslinking part, R1 to R10 each are hydrogen or a substituent group, R11 is a substituent group and X is an atom or substituent group, as described later.

Preferred examples of the crosslinking part L are crosslinked parts of methylene, ethylene, isopropylene, dimethylsilylene, diphenylsilylene and methylphenylsilylene.

At least one of R1 to R5, at least one of R6 to R10 and R11 each are a substituent group and these substituent groups may be the same as or different from each other. Though substituents are not particularly limited, examples thereof include alkyl groups such as methyl, ethyl, n-propyl, i-propyl, n-butyl, i-butyl, t-butyl, pentyl, hexyl, heptyl, cyclopentyl, cyclohexyl, pentadienyl, phenyl and methylphenyl groups.

Examples of the substituent groups other than alkyl groups may include:

halogen or halogen-containing groups such as fluorine, bromine, chlorine, trichloromethyl group, dichloromethyl group, trifluoromethyl group, pentafluorophenyl group;

oxygen-containing groups such as methoxy group, ethoxy group, n-propoxy group, i-propoxy group, phenoxy group, 2,4,6-trimethylphenoxy group, methoxymethyl group, 2-methoxy ethyl group, 4-methoxyphenyl group, formyl group, acetyl group, benzoyl group, p-chlorobenzoyl group, p-methoxybenzoyl group, acetyloxy group, benzoyloxy group, methoxycarbonyl group, phenoxycarbonyl group and p-chlorophenoxycarbonyl group;

nitrogen-containing groups such as acetaminde group, N-methylacetamide group, N-methylbenzamide group, methylamino group, dimethylamino group, diethylamino group, dipropylamino group, dibutylamino group, dicyclohexylamino group, phenylamino group, diphenylamino group, ditolylamino group, dinaphthylamino group, methylphenylamino group, acetoimide group, benzimide group, methylimino group, ethylimino group, propylimino group, butylimino group and phenylimino group;

sulfur-containing groups such as methylthlo group, ethylthio group, phenylthio group, methylphenylthio group, naphthylthio group, acetylthio group, benzoylthio group, methylthiocarbonyl group, phenylthiocarbonyl group, sulphenylsulfonamide group, N-methylsulfonaminde group, N-methyl-p-toluene sulfonamide group, methylsulfonic acid group, ethylsulfonic acid group, phenylsulfonic acid group, methylsulfonate group, trifluoromethane sulfonate group, phenylsulfonate group, benzylsulfonate group, p-toluene sulfonate group, trimethylbenzene sulfonate group, triisobutylbenzene sulfonate group, p-chlorobenzene sulfonate group, pentafluorobenzene sulfonate group, methylsulfinate group, phenylsulfinate group, benzyl sulfinate group, p-toluene sulfinate group, trimethylbenzene sulfinate group and pentafluorobenzene sulfinate group;

phosphorus-containing groups such as dimethylphosphino group, diphenylphosphino group, methylphosphoryl group, isopropylphosphoryl group, phenyl phosphoryl group, methylphosphothioyl group, isopropylphosphothioyl group, phenylphosphothioyl group, dimethyl phosphoric acid group, diisopropyl phosphoric acid group and diphenyl phosphoric acid group. Further examples of X may include substituent groups as described later.

At least two groups of R1 to R5 and/or R6 to R10, preferably neighboring groups may be linked each other to form an aliphatic ring, aromatic ring or hydrocarbon ring including a hetero atom (for example, nitrogen atom), and further these rings may have a substituent group. It is preferred in the present invention that the neighboring groups are linked each other to form a hydrocarbon ring including an aliphatic ring or aromatic ring. Particularly, preferred examples of the substituted cyclopentadienyl ring in which the neighboring groups are linked each other to form a hydrocarbon ring including an aliphatic ring and aromatic ring may include indenyl group, tetrahydroindenyl group, fluorenyl group, 2-methylindenyl group, 2,4-dimethylindenyl group, 2-ethylindenyl group, 2-n-propylindenyl group, 2-methyl-4-ethylindenyl group, 2-methyl-4-phenylindenyl group, 2-methyl-4-(1-naphthyl) indenyl group, 2-n-propyl-4-(9-phenanetolyl)indenyl group, 2-methylfluorenyl group, 2-ethylfluorenyl group, 2,7-dimethylfluorenyl group, and 2-methyl-7-ethylfluorenyl group.

X shows hydrogen atom, a halogen atom, oxygen atom, hydrocarbon group, oxygen-containing group, sulfur-containing group, nitrogen-containing group, boron-containing group, aluminum-containing group, phosphorus-containing group, halogen-containing group, hetero-cyclic compound residue, silicon-containing group, germanium-containing group or tin-containing group. When X is an oxygen atom, M and X are linked with double bond.

Examples of the halogen atom may include fluorine, chlorine bromine and iodine.

Examples of the hydrocarbon group may include an alkyl group such as methyl, ethyl, propyl, butyl, hexyl, octyl, nonyl, dodecyl and eicosyl; a cycloalkyl group of 3 to 30 carbon atoms such as cyclopentyl, cyclohexyl, norbornyl and adamantyl; an alkenyl group such as vinyl, propenyl and cyclohexenyl; an arylalkyl group such as benzyl, phenylethyl, phenylpropyl; and an aryl group such as phenyl, tolyl, dimethylphenyl, trimethylphenyl, ethylphenyl, propylphenyl, biphenyl, naphthyl, methylnaphthyl, antolyl and phenanetolyl. These hydrocarbon groups may include halogenated hydrocarbons, for example, groups in which at least one hydrogen in a hydrocarbon group of 1 to 30 carbon atoms is substituted with halogen. Of these, the hydrocarbon groups having 1 to 20 carbon atoms are preferred.

Examples of the oxygen-containing group may include oxy group; peroxy group; hydroxy group; hydroperoxy group; alkoxy groups such as methoxy, ethoxy, propoxy and butoxy; aryloxy groups such as phenoxy, methylphenoxy, dimethylphenoxy and naphthoxy; arylalkoxy groups such as phenylmethoxy and phenylethoxy; acetoxy group; carbonyl group; acetylacetonate group (acac); and oxo group.

Examples of the sulfur-containing group may include sulfonate groups such as methyl sulfonate, trifluoromethane sulfonate, phenyl sulfonate, benzyl sulfonate, p-toluene sulfonate, trimethylbenzene sulfonate, triisobutylbenzene sulfonate, p-chlorobenzene sulfonate and pentafluorobenzene sulfonate; sulfinate groups such as methyl sulfinate, phenyl sulfinate, benzyl sulfinate, p-toluene sulfinate, trimethyl benzene sulfinate and penta-fluorobenzene sulfinate; alkyl thio group; aryl thio group; sulfuric acid group; sulfide group; polysulfide group and thiolate group.

Examples of the nitrogen-containing groups may include amino groups; alkylamino groups such as methylamino, dimethylamino, diethylamino, dipropylamino, dibutylamino and dicyclohexylamino; arylamino or alkylarylamino groups such as phenyl amino, diphenyl amino, ditolyl amino, dinaphthyl amino and methylphenyl amino; alkyl or arylamine groups such as trimethyl amine, triethyl amine, triphenyl amine, N,N,N',N'-tetramethylethylene diamine (tmeda) and N,N,N',N'-tetraphenylpropylene diamine (tppda).

Examples of the boron-containing group may include $BR_4$ where R is hydrogen, an alkyl group, aryl group optionally having a substituent group or a halogen atom.

Examples of the aluminum-containing group may include $AlR_4$ where R is hydrogen, an alkyl group, aryl group optionally having a substituent group or a halogen atom.

Examples of the phosphorus-containing group may include trialkyl phosphine groups such as trimethyl phosphine, tributyl phosphine and tricyclohexyl phosphine; triaryl phosphine group such as triphenyl phosphine and tritolyl phosphine; phosphate groups (phosphide groups) such as methyl phosphate, ethyl phosphate and phenyl phosphate; phosphonic acid group; and phosphinic acid group.

Examples of the halogen-containing group may include fluorine-containing groups such as $PF_6$ and $BF_4$, chlorine-containing groups such as $ClO_4$ and $SbCl_6$ and iodine-containing group such as $IO_4$.

Examples of the heterocyclic compound residue may include residues of nitrogen-containing compound including pyrrol, pyridine, pyrimidine, quinoline and triazine, oxygen-containing group including furan and pyran, and sulfur-containing compound including thiophene; and groups obtained by further substituting these heterocyclic compound residues with a substituent group such as an alkoxy or alkyl group having 1 to 30 carbon atoms, preferably 1 to 20 carbon atoms.

Examples of the silicon-containing group may include hydrocarbon-substituted silyl groups such as phenyl silyl, diphenyl silyl, trimethyl silyl, triethyl silyl, tripropyl silyl, tricyclohexyl silyl, triphenyl silyl, methyldiphenyl silyl, tritolyl silyl and trinaphthyl silyl; hydrocarbon-substituted silylether groups such as trimethyl silylether; silicon-substituted alkyl groups such as trimethyl silylmethyl; silicon-substituted aryl groups such as trimethyl silylphenyl.

Examples of the germanium-containing group may include groups obtained by substituting silicon in the above silicon containing groups with germanium.

Examples of the tin-containing group may include groups prepared by substituting silicon in the above silicon containing groups with tin.

When n is two or greater, plural atoms or groups represented by X may be the same as or different each other, and further, plural groups X may be linked each other to form a ring. Examples of the organic hafnium compounds represented by the formulas (1) to (3) are described in below, but the present invention is not limited thereby.

Examples of the organic hafnium compound of the formula (1) may include bis(methylcyclopentadienyl)hafnium dichloride,
bis(dimethylcyclopentadienyl)hafnium dichloride,
bis(dimethylcyclopentadienyl)hafnium ethoxy chloride,
bis(dimethylcyclopentadienyl)hafnium bis(trifluoromethane sulfonate),
bis(ethylcyclopentadienyl)hafnium dichloride,
bis(methylethylcyclopentadienyl)hafnium dichloride,
bis(propylcyclopentadienyl)hafnium dichloride,
bis(methylpropylcyclopentadienyl)hafnium dichloride,
bis(butylcyclopentadienyl)hafnium dichloride,
bis(methylbutylcyclopentadienyl)hafnium dichloride,
bis(methylbutylcyclopentadienyl)hafnium bis(methane sulfonate),
bis(trimethylcyclopentadienyl)hafnium dichloride,
bis(tetramethylcyclopentadienyl)hafnium dichloride,
bis(pentamethylcyclopentadienyl)hafnium dichloride,
bis(hexylcyclopentadienyl)hafnium dichloride and
bis(trimethylsilylcyclopentadienyl)hafnium dichloride.

Examples of the organic hafnium compound of the formula (2) may include rac-ethylene-bis(indenyl)hafnium dichloride,
rac-ethylene-bis(tetrahydroindenyl)hafnium dichloride,
rac-dimethylsilylene-bis(2,3,5-trimethyl cyclopentadienyl) hafnium dichloride,
rac-dimethylsilylene-bis(1-(4-phenylindenyl)hafnium dichloride,
rac-dimethylsilylene-bis[1-(2-methyl-4-phenylindenyl) hafnium dichloride,
rac-dimethylsilylene-bis{1-[(2-methyl-4-(1-naphthyl) indenyl]} hafnium dichloride,
rac-dimethylsilylene-bis{1-[(2-methyl-4-(2-naphthyl) indenyl]} hafnium dichloride,
rac-dimethylsilylene-bis{1-[2-methyl-4-(1-anthracenyl) indenyl]} hafnium dichloride,
rac-dimethylsilylene-bis{1-[2-methyl-4-(9-anthryl)indenyl]} hafnium dichloride,
rac-dimethylsilylene-bis{1-[(2-methyl-4-(9-phenanthryl) indenyl]} hafnium dichloride,
rac-dimethylsilylene-bis{1-[2-methyl-4-(o-chlorophenyl) indenyl]} hafnium dichloride,
rac-dimethylsilylene-bis{1-[2-methyl-4-(pentafluorophenyl) indenyl]} hafnium dichloride,
rac-dimethylsilylene-bis[1-(2-ethyl-4-phenyl indenyl)] hafnium dichloride,
rac-dimethylsilylene-bis{1-[2-ethyl-4-(1-naphthyl) indenyl]} hafnium dichloride,
rac-dimethylsilylene-bis{1-[2-ethyl-4-(9-phenanethryl) indenyl]} hafnium dichloride,
rac-dimethylsilylene-bis[1-(2-n-propyl-4-phenyl indenyl)] hafnium dichloride,
rac-dimethylsilylene-bis{1-[(2-n-propyl-4-(1-naphthyl) indenyl]} hafnium dichloride,
rac-dimethylsilylene-bis{1-[2-n-propyl-4-(9-phenanthryl)indenyl]} hafnium dichloride,
ethylene[(2-methyl-4-(9-phenanthryl)-1-indenyl] (9-fluorenyl) hafnium dichloride, ethylene[2-methyl-4-(9-phenanthryl)-1-indenyl](2,7-dimethyl-9-fluorenyl) hafnium dichloride,
dimethylsilylene (9-fluorenyl)(3-t-butyl cyclopentadienyl) hafnium dichloride, and
diphenylsilylene (9-fluorenyl)(3-t-butyl cyclopentadienyl) hafnium dichloride.

Examples of the organic hafnium compound of the formula (3) may include (t-butylamide)(tetramethyl-η5-cyclopentadienyl)-1,2-ethanediyl hafnium dichloride,
(t-butylamide)(tetramethyl-η5-cyclopentadienyl)-1,2-ethanediyl hafnium dimethyl,
(methylamide)(tetramethyl-η5-cyclopentadienyl)-1,2-ethanediyl hafnium dichloride,
(ethylamide)(tetramethyl-η5-cyclopentadienyl)methylene hafnium dichloride,
(t-butylamide)dimethyl(tetramethyl-η5-cyclopentadienyl)-silane hafnium dichloride,
(t-butylamide)dibenzyl(tetramethyl-η5-cyclopentadienyl)-silane hafnium dichloride,
(t-butylamide)dimethyl(tetramethyl-η5-cyclopentadienyl)-silane hafnium dibenzyl,
(benzylamide)dimethyl(tetramethyl-η5-cyclopentadienyl)-silane hafnium dichloride, and
(phenylphosphide)dimethyl(tetramethyl-η5-cyclopentadienyl) silane hafnium dibenzyl.

Among the above, the organic hafnium compounds of the formula (2) are more preferred. Particularly, preferred compounds are ethylene bis(indenyl)dimethyl hafnium,
ethylene bis(indenyl)diethyl hafnium,
ethylene bis(indenyl)diphenyl hafnium,
ethylene bis(indenyl)methyl hafnium monochloride,
ethylene bis(indenyl)ethyl hafnium monochloride,
ethylene bis(indenyl)methyl hafnium monobromide,
ethylene bis(indenyl) hafnium dichloride,
ethylene bis(indenyl)hafnium dibromide,
ethylene bis(4,5,6,7-tetrahydro-1-indenyl)dimethyl hanium,
ethylene bis(4,5,6,7-tetrahydro-1-indenyl)methyl hafnium monochloride,
ethylene bis(4,5,6,7-tetrahydro-1-indenyl)hafnium dichloride,
ethylene bis(4,5,6,7-tetrahydro-1-indenyl)hafnium dibromide,
ethylene bis(4-methyl-1-indenyl)hafnium dichloride,
ethylene bis(5-methyl-1-indenyl)hafnium dichloride,
ethylene bis(6-methyl-1-indenyl)hafnium dichloride,
ethylene bis(7-methyl-1-indenyl)hafnium dichloride,
ethylene bis(5-methoxy-1-indenyl)hafnium dichloride,
ethylene bis(2,3-dimethyl-1-indenyl)hafnium dichloride,
ethylene bis(4,7-dimethyl-1-indenyl)hafnium dichloride and ethylene bis(4,7-dimethoxy-1-indenyl)hafnium dichloride.

The above organic hafnium compounds may contain a small amount of zirconium or titanium. In this case, the amount of zirconium or titanium is preferably not more than 1% by weight, more preferably not more than 0.7% by weight, further preferably not more than 0.5% by weight.

The above organic hafnium compounds may be used singly or in combination with two or more, and further may be used in combination with an ethylene polymerization catalyst other than the organic hafnium compounds.

Further, the above organic hafnium compounds may be used in a state supported on an organic carrier or inorganic carrier. The carriers may be used singly or in combination with two or more and further may be a complex oxide. As the process for supporting on these carriers, any conventional processes are employable. Examples of the inorganic carrier are silica, alumina, magnesium chloride, clay mineral, magnesia, zirconia, titania, manganese chloride, nickel chloride and calcium chloride. Examples of the organic carrier are polyethylene, polypropylene, polybutene, poly(3-methyl-1-butene), poly(4-methyl-1-pentene), polystyrene and styrene-divinylbenzene copolymer. The above organic hafnium compounds may be supported on the above carrier singly or in combination with two or more. The above organic hafnium compounds may be supported in combination with an organic boron compound and/or organic aluminum compound as described below.

Examples of the organic boron compound may include triphenyl boron, tris(4-fluorophenyl) boron, tris(3,5-difluorophenyl) boron, tris(4-fluoromethylphenyl) boron, tris(pentafluorophenyl) boron, tris(p-tolyl) boron, tris(o-tolyl) boron, tris(3,5-dimethylphenyl) boron, thexylborane, dicyclohexyl borane, dicyamyl borane, 9-borabicyclo[3,3,1]nonane, dimethylborane, dichloroborane, catechol borane, B-bromo-9-borabicyclo[3.3.1] nonane, borane-triethylamine complex and borane-methyl sulfide complex.

As the organic boron compounds, ionic boron compound may be used. Examples thereof may include:
triethylammonium tetra(phenyl)boron,
tripropylammonium tetra(phenyl) boron,
trimethylammonium tetra(p-tolyl) boron,
trimethylammonium tetra(o-tolyl)boron,
tri(n-butyl)ammonium tetra(pentafluorophenyl)boron,
tripropylammonium tetra(o,p-dimethylphenyl)boron,
tri(n-butyl)ammonium tetra(p-trifluoromethyl phenyl)boron,
N,N-dimethylanilinium tetra(phenyl)boron,
dicyclohexylammonium tetra(phenyl)boron,
triphenylcarbenium tetrakis(pentafluorophenyl)borate,
N,N-dimethylanilinium tetrakis(pentafluorophenyl)borate,
bis[tri(n-butyl)ammonium]nonaborate, and
bis[tri(n-butyl)ammonium]decaborate.

The above organic boron compounds may be used singly or in combination with two or more. Further, the organic boron compounds may be used in combination with the following organic aluminum compounds.

For example, compounds represented by the following formula may be described as the organic aluminum compounds.

$$R^a{}_n AlX_{3-n}$$

In the formula, $R^a$ is a hydrocarbon group having 1 to 12 carbon atoms, X is halogen or hydrogen and n is an integer of 0 to 3.

Examples of $R^a$ may include a hydrocarbon group having 1 to 12 carbon atoms such as alkyl group, cycloalkyl group or aryl group, specifically, methyl, ethyl, n-propyl, isopropyl, isobutyl, pentyl, hexyl, octyl, cyclopentyl, cyclohexyl, phenyl and tolyl.

Examples of such organic aluminum compounds may include:
tri-alkyl aluminum such as tri-methyl aluminum, tri-ethyl aluminum, tri-isopropyl aluminum, tri-isobutyl aluminum, tri-octyl aluminum or tri-2-ethyl hexyl aluminum;
tri-alkenyl aluminum such as tri-isoprenyl aluminum;
di-alkyl aluminum halide such as dimethyl aluminum chloride, diethyl aluminum chloride, di-isopropyl aluminum chloride, di-isobutyl aluminum chloride or dimethyl aluminum bromide;
alkyl aluminum sesqui-halide such as methyl aluminum sesqui-chloride, ethyl aluminum sesqui-chloride, isopropyl aluminum sesqui-chloride, butyl aluminum sesqui-chloride or ethyl aluminum sesqui-bromide;

alkyl aluminum di-halide such as methyl aluminum dichloride, ethyl aluminum dichloride, isopropyl aluminum dichloride or ethyl aluminum di-bromide; and alkyl aluminum hydride such as di-ethyl aluminum hydride, di-iso-butyl aluminum hydride or ethyl aluminum dihydride.

Further, compounds represented by the following formula may be used as the organic aluminum compounds.

$R^a{}_n AlY_{3-n}$

In the formula, $R^a$ is the same as in the above.

Y is $-OR^b$, $-OSiR^c{}_3$, $-OAlR^d{}_2$, $-NR^e{}_2$, $-SiR^f{}_3$ or $-N(R^g)AlR^h{}_2$, n is 1 or 2, $R^b$, $R^c$, $R^d$ and $R^h$ each are methyl, ethyl, isopropyl, isobutyl, cyclohexyl or phenyl, $R^e$ is hydrogen, methyl, ethyl, isopropyl, phenyl or trimethylsilyl and $R^f$ and $R^g$ each are methyl or ethyl.

Examples of the organic aluminum compound may include the following compounds.

(i) Compound of $R^a{}_n Al(OR^b)_{3-n}$ such as dimethyl aluminum methoxide, diethyl aluminum ethoxide or di-isobutyl aluminum methoxide, (ii) Compound of $R^a{}_n Al(OSiR^c)_{3-n}$ such as $Et_2Al(OSiMe_3)$, $(iso-Bu)_2Al(OSiMe_3)$ or $(iso-Bu)_2Al(OSiEt_3)$ (iii) Compound of $R^a{}_n Al(OAlR^d{}_2)_{3-n}$ such as $Et_2AlOAlEt_2$ or $(iso-Bu)_2AlOAl(iso-Bu)_2$, (iv) Compound of $R^a{}_n Al(NR^e{}_2)_{3-n}$ such as $Me_2AlNEt_2$, $Et_2AlNHMe$, $Me_2AlNHEt$, $Et_2AlN(Me_3Si)_2$ or $(iso-Bu)_2AlN(Me_3Si)_2$, (v) Compound of $R^a{}_n Al(SiR^f{}_3)_{3-n}$, such as $(iso-Bu)_2AlSiMe_3$, (vi) Compound of $R^a{}_n Al[N(R^g)-AlR^h{}_2]_{3-n}$ such as $Et_2AlN(Me)-AlEt_2(iso-Bu)_2$ or $AlN(Et)Al(iso-Bu)_2$.

Further examples of the organic aluminum compound may include compounds similar to these compounds, for example, organic aluminum compounds in which two or more aluminums are linked through an oxygen atom or nitrogen atom.

Examples thereof are $(C_2H_5)_2AlOAl(C_2H_5)_2$, $(C_4H_9)_2AlOAl(C_4H_9)_2$ and $(C_2H_5)_2AlN(C_2H_5)Al(C_2H_5)_2$.

Further examples thereof may include aluminoxanes such as methyl aluminoxane, ethyl aluminoxane, propyl aluminoxane and butyl alumioxane.

Moreover, organic aluminum compounds represented by the following formula may be used as the organic aluminum compounds.

$R^a AlXY$

In the formula, $R^a$, X and Y are the same as in the above.

In the present invention, it is preferred to use the above organic aluminum compounds, and the organic aluminum is more preferably trialkyl aluminum.

The olefin polymerization catalyst which essentially comprises the organic hafnium compound and organic boron compound may be subjected to prepolymerization. The process for prepolymerization is not particularly limited, for example, a process in the presence of an inert solvent comprises the steps of adding an olefin and each catalyst components to the inert solvent and carrying out prepolymerization preferably under relatively mild conditions. The process may be carried out under the conditions that the produced prepolymer is dissolved in the polymerization medium, or the condition that it is not dissolved in the medium, preferably the conditions that it is not dissolved in the medium.

Examples of the olefin used in the prepolymerization may include α-olefins having two or more carbon atoms such as ethylene, propylene, 1-butene, 1-pentene, 1-hexene, 3-methyl-1-butene, 3-methyl-1-pentene, 3-ethyl-1-pentene, 4-methyl-1-pentene, 4,4-dimethyl-1-pentene, 4-methyl-1-hexene, 4,4-dimethyl-1-hexene, 4-ethyl-1-hexene, 3-ethyl-1-hexene, 1-octene, 1-decene, 1-dodecene, 1-tetradecene, 1-hexadecene, 1-octadecene, and 1-eicosene. These may be used in combination with two or more. Further, the α-olefin used in the prepolymerization may be the same as or different from those used in the olefin polymerization as described later, preferably the same as those.

Examples of the inert solvent are aliphatic hydrocarbons such as propane, butane, pentane, hexane, heptane, octane, decane, dodecane and kerosine; alicyclic hydrocarbons such as cyclopentane, cyclohexane and methylcyclopentane; aromatic hydrocarbons such as benzene, toluene and xylene; halogenated hydrocarbon such as ethylene chloride and chlorobenzene. These may be used in combination.

Particularly, it is preferred to use the aliphatic hydrocarbons, of these inert solvents. The prepolymerization may be carried out under the conditions that the α-olefin is in a liquid state, or under a gas phase condition. The prepolymerization may be carried out in any of batch, semi-continuous and continuous processes. Further, in the prepolymerization, it is preferred to use a catalyst having a higher concentration than that of the catalyst inside the main polymerization system.

The ethylene polymer is obtainable by polymerization of ethylene singly or copolymerization of ethylene and α-olefins of 3 to 20 carbon atoms in the presence of the catalyst as described above (hereinafter sometimes referred to as "olefin polymerization" simply).

The olefin polymerization can be carried out with any process of a liquid phase polymerization process such as solution polymerization and suspension polymerization, or a gas phase polymerization process. The reaction solvent usable in suspension polymerization may be the above inert solvent or olefins in a liquid state at a reaction temperature. In the present invention, liquid phase polymerization is preferable, and further, solution polymerization is more preferable. The reaction temperature is generally from 0° C. to 190° C., preferably 40° C. to 180° C., more preferably 50° C. to 170° C., further preferably 60° C. to 160° C. When the reaction temperature is lower than or higher than the above ranges, the retention of the temperature is difficult industrially, thereby inducing disadvantage in production. The polymerization pressure is generally from 0.01 to 10 MPa, preferably 0.1 to 5 MPa. The olefin polymerization can be carried out with any of batch, semi-continuous and continuous processes. When the olefin polymerization is carried out in two or more steps, the reaction conditions may be the same or different. The molecular weight of the polymer can be regulated by hydrogen and/or polymerization temperature.

The density of the polymer can be appropriately regulated by the amount of an α-olefin added and/or the polymerization temperature.

Consequently, the first ethylene polymer of the invention is prepared by a process that an α-olefin having three or more carbon atoms is not added and ethylene polymerization is carried out at a relatively higher temperature of 100° C., or a process that an α-olefin such as hexene is added in a small amount of about 1 ml based on 100 liters of ethylene and polymerization is carried out at a temperature of 60 to 80° C.

The second ethylene polymer of the invention is prepared by, for example, slurry polymerization under pressure of ethylene of 0.9 Mpa, at 80° C. for 1.5 hr in such a way that about 40 ml of hexene is added or an α-olefin having smaller carbon atoms than those of hexene is added in a larger amount than the above amount.

The third ethylene polymer of the invention can be prepared by the same processes as the first and second polymers.

The ethylene polymer of the invention can be mixed with a thermoplastic resin, filler, nucleating agent and additive usable for polymers in arbitrary amounts and, further, may be subjected to post modification such as crosslinking or foaming. The ethylene polymer of the invention is useful as a modifier for resins. In the case of mixing with thermoplastic resins, the ethylene polymer of the invention is mixed with the thermoplastic resins in a proportion of from 99.9/0.1 to 0.1/99.9.

Usable examples of the thermoplastic resin may include crystalline thermoplastic resins such as polyolefin, polyamide, polyester and polyacetal; and non-crystalline thermoplastic resins such as polystyrene, acrylonitrile/butadiene/styrene copolymer (ABS), polycarbonate, polyphenylene oxide and polyacrylate. Further, polyvinyl chloride is also preferably used.

Examples of the above polyolefin may include ethylene polymer, propylene polymer, butene polymer, 4-methyl-1-pentene polymer, 3-methyl-1-butene polymer and hexene polymer. Among them, ethylene polymer, propylene polymer and 4-methyl-1-pentene polymer are preferable. The ethylene polymer used as the polyolefin may be the ethylene polymer of the present invention, conventional ethylene polymer or ethylene/polar group-containing vinyl copolymer, preferably the conventional ethylene polymer.

Examples of the polyester may include aromatic polyesters such as polyethylene terephthalate, polyethylene naphthalate and polybutylene terephthalate, and polycaprolactam and polyhydroxybutylate.

Examples of the polyamide may include aliphatic polyamides such as nylon-6, nylon-66, nylon-10, nylon-12, and nylon-46, and an aromatic polyamide prepared by an aromatic dicarboxylic acid and aliphatic diamine.

Examples of the polyacetal may include polyformaldehyde (polyoxymethylene), polyacetoaldehyde, polypropionaldehyde and polybutylaldehyde. Particularly, among them, polyformaldehyde is preferable.

The above polystyrene may be either a styrene homopolymer or a binary copolymer of styrene and acrylonitrile, methyl methacrylate or α-methylstyrene.

An ABS comprising 20 to 35 mol % of a structural unit derived from acrylonitrile, 20 to 30 mol % of a structural unit derived from butadiene, 40 to 60 mol % of a structural unit derived from styrene is preferably used as the above ABS.

Examples of the above polycarbonate may include polymers obtainable from bis(4-hydroxyphenyl)methane, 1,1-bis (4-hydroxyphenyl)ethane, 2,2-bis(4-hydroxyphenyl)propane or 2,2-bis(4-hydroxyphenyl)butane. Particularly polycarbonate obtainable from 2,2-bis(4-hydroxyphenyl) propane is preferable among them.

The polyphenylene oxide used preferably is poly(2,6-dimethyl-1,4-phenylene oxide).

The polyacrylate used preferably may include polymethylmethacrylate and polybutylacrylate.

The thermoplastic resins may be used singly or in combination with tow or more. Particularly, the preferable thermoplastic resin is polyolefin and more preferable one is the ethylene polymer.

The ethylene polymer of the present invention may contain, in addition to the above thermoplastic resin, a cross-linking agent, filler, cross-linking accelerator, cross-linking assistant, softener, tackifier, antioxidant, foaming agent, processing assistant, adhesion-imparting agent, inorganic filler, organic filler, crystalline nucleating agent, heat resistant stabilizer, weather resistant stabilizer, anti static agent, colorant, lubricant, flame retardant and blooming-inhibitor.

Examples of the cross-linking agent may include sulfur, a sulfur compound and organic peroxide. The organic peroxide having the half-life period of 1 min at a temperature from 130 to 200° C. is preferable. Preferable examples thereof are dicumylperoxide, di-t-butyl peroxide, di-t-butyl peroxy-3,3, 5-trimethylcyclohexane, t-butyl cumyl peroxide, di-t-amyl peroxide, t-butyl hydroperoxide and 2,5-dimethyl-2,5-di-(t-butylperoxy)-hexane. In the case of using the organic peroxide as the cross-linking agent, simultaneous use of the cross-linking agent is preferred.

Of the above various cross-linking agents, sulfur and the sulfur compound are preferable because the use of sulfur can prepare crosslinked products having excellent properties. The organic peroxide is more preferable because of having an excellent cross-linking efficiency.

Usable examples of the cross-linking accelerator are N-cyclohexyl-2-benzothiazole sulfene amide (CBZ), N-oxydiethylene-2-benzothiazole sulfene amide, N,N-diisopropyl-2-benzothiazole sulfene amide, 2-mercaptobenzothiazole and 2-(2,4-dinitrophenyl)mercaptobenzothiazole.

The cross-linking assistant is used in cross-linking using the organic peroxide. Examples of the cross-linking assistant are sulfur; quinone dioxime compounds such as p-quinone dioxime and p,p'-benzoyl quinone dioxime, and poly-functional monomers, i.e. (meth)acrylate compounds such as trimethylol propane triacrylate, polyethylene glycol dimethacrylate;

allyl compounds such as diallylphthalate and triallyl cyanurate; maleimide compounds such as N,N'-m-phenylene bismaleimide; and divinyl benzene.

As the softener, softeners mixed for conventional polyolefins are used widely. Examples of the softener are petroleum softeners such as process oil, lubricating oil, paraffin, fluid paraffin, petroleum asphalt and Vaseline; coal tar softeners such as coal tar and coal tar pitch; aliphatic oil softeners such as castor oil, linseed oil, rape oil and coconut oil; tall oil; factice; waxes such as beeswax, carnauba wax and lanolin; aliphatic acids and aliphatic acid salts such as ricinoleic acid, palmitic acid, barium stearate, calcium stearate, zinc laurate; and synthesized polymer substances such as petroleum resins, atactic polypropylene and cumarone-indene resin. Among them, the petroleum softeners are preferably used, and particularly, process oil is preferably used.

As the foaming agent, foaming agents generally used in foaming and molding polyolefins can be used widely. Examples of the foaming agent are inorganic foaming agents such as sodium bicarbonate, sodium carbonate, ammonium bicarbonate, ammonium carbonate, ammonium nitrite; nitroso compounds such as N,N'-dimethyl-N,N'-dinitrosoterephthalamide and N,N'-dinitrosopentamethylene tetramine; azo compounds such as azodicarbonamide, azobisisobutylonitrile, azocyclohexylnitrile, azodiaminobenzene and bariumazodicarboxylate; sulfonyl hydrazide compounds such as benzene sulfonyl hydrazide, toluene sulfonyl hydrazide, p,p'-oxybis(benzene sulfonyl hydrazide) and diphenyl sulfone-3,3'-disulfonyl hydrazide; and azide compounds such as carcium azide, 4,4'-diphenyl disulfonyl azide and p-toluene sulfonyl azide. Of these, the nitroso compounds, azo compounds and azide compounds are preferable.

The foaming assistant can be used with the foaming agent. The simultaneous use of the foaming agent with the foaming assistant contributes to lowering of the decomposition temperature of the foaming agent, acceleration of decomposition and homogenization of bubbles. Examples of the foaming assistant may include organic acids such as salicyllc acid, phthalic acid, stearic acid and nitric acid, urea and derivatives thereof.

Examples of the processing assistant may include acids such as ricinoleic acid, stearic acid, palmitic acid and lauric acid, salts of these higher aliphatic acids such as barium stearate, zinc stearate and calcium stearate and esters.

The adhesion-imparting agent improves adhesion between a cross-linked product and a facing layer such as coating film, and may include an organic tin compound, tertiary amine compound, hydroxyl group-containing (co)polymer and metal hydroxy compound.

Examples of the inorganic filler may include silica, diatomaceous earth, alumina, titanium oxide, magnesium oxide, pumice, pumice balloon, aluminum hydroxide, magnesium hydroxide, basic magnesium carbonate, dolomite, calcium sulfate, calcium titanate, barium sulfate, calcium sulfite, talc, clay, mica, asbestos, glass fiber, glass flake, glass beads, calcium silicate, montmorillonite, bentonite, graphite, aluminum powder and molybdenum sulfate.

Among them, layered compounds are preferably used, and particularly, clay minerals having swelling and cleavage properties to the dispersion medium are preferably used. The clay minerals are classified into a type having a two-layered structure which comprises a silica tetrahedral layer and, formed thereon, an octahedral layer having a center of metals such as aluminum or magnesium, and a type having a three-layered structure which comprises an octahedral layer having a center of metals such as aluminum or magnesium held between silica tetrahedral layers.

The former two-layered structure type compounds are kaolinite group and antigorite group. The latter three-layered structure type compounds are smectites group, vermiculite group and mica group, which are different by the interlayer cation number.

Specific examples of the clay minerals are kaolinite, dickite, nacrite, halloysite, antigorite, chrysotile, pyrophyllite, montmorillonite, beidellite, nontronite, saponite, sauconite, stevensite, hectorite, tetrasilylic mica, sodium taeniolite, muscovite, mercallite, talc, vermiculite, phlogopite, xanthophyllite and chlorite.

Further, clay minerals treated with organic compounds (hereinafter referred to as organic modified clay minerals) can be also used as the inorganic layered compound. (For the clay minerals treated with organic compounds, refer to "Clay cyclopedia" published by Asakura Book Co.)

Among the above clay minerals, from the standpoint of the swelling and cleavage properties, smectites group, vermiculite group and mica group are preferable, and further, smectites group is more preferably. Examples of smectites group are montmorillonite, beidellite, nontronite, saponite, sauconite, stevensite and hectorite.

The dispersion mediums which swells and cleaves the inorganic layered compounds, when the clay minerals are natural clay minerals having swelling properties, are water, alcohols such as methanol, ethanol, propanol, isopropanol, ethylene glycol and diethylene glycol, dimethylformamide, dimethyl sulfoxide and acetone. Further, water, alcohols such as methanol etc. are more preferable.

When the clay minerals are the organic modified clay minerals, the dispersion mediums are aromatic hydrocarbons such as benzene, toluene and xylene, ethers such as ethyl ether and tetrahydrofurane, ketones such as acetone, methyl ethyl ketone and methyl isobutyl ketone, aliphatic hydrocarbons such as n-pentane, n-hexane and n-octane, halogenated hydrocarbons such as chlorobenzene, carbon tetrachloride, chloroform, dichloromethane, 1,2-dichloroethane, perchloroethylene, ethyl acetate, methyl methacrylate(MMA), dioctyl phthalate(DOP), dimethylformamide, dimethyl sulfoxide, methylcellosolve and silicone oil.

As the crystalline nucleating agent, conventionally known various nucleating agents are used without particular limitation. Examples of the crystalline nucleating agents are the following salts of aromatic phosphate, benzylidene sorbitol, aromatic carboxylic acid and rosin nucleating agent.

Examples of salts of aromatic phosphate may include:
sodium-2,2'-methylene-bis(4,6-di-t-butylphenyl)phosphate,
sodium-2,2'-ethylidene-bis(4,6-di-t-butylphenyl) phosphate,
lithium-2,2'-methylene-bis(4,6'-di-t-butylphenyl) phosphate,
lithium-2,2'-ethylidene-bis(4,6-di-t-butylphenyl) phosphate,
sodium-2,2'-ethylidene-bis(4-i-propyl-6-t-butylphenyl) phosphate,
lithium-2,2'-methylene-bis(4-methyl-6-t-butylphenyl) phosphate,
lithium-2,2'-methylene-bis(4-ethyl-6-t-butylphenyl) phosphate,
calcium-bis[2,2'-thiobis(4-methyl-6-t-butylphenyl) phosphate],
calcium-bis[2,2'-thiobis(4-ethyl-6-t-butylphenyl) phosphate],
calcium-bis[2,2'-thiobis(4,6-di-t-butylphenyl) phosphate],
magnesium-bis[2,2'-thiobis(4,6-di-t-butylphenyl) phosphate],
magnesium-bis[2,2'-thiobis(4-n-octylphenyl)phosphate],
sodium-2,2'-butylidene-bis(4,6-di-methylphenyl) phosphate,
sodium-2,2'-butylidene-bis(4,6-di-t-butylphenyl) phosphate,
sodium-2,2'-t-octylmethylene-bis(4,6-di-methylphenyl) phosphate,
sodium-2,2'-t-octylmethylene-bis(4,6-di-t-butylphenyl) phosphate,
calcium-bis-[2,2'-methylene-bis(4,6-di-t-butylphenyl) phosphate],
magnesium-bis-[2,2'-methylene-bis(4,6-di-t-butyl phenyl)phosphate],
barium-bis-[2,2'-methylene-bis(4,6-di-t-butyl phenyl) phosphate],
sodium-2,2'-methylene-bis(4-methyl-6-t-butylphenyl) phosphate],
sodium-2,2'-methylene-bis(4-ethyl-6-t-butylphenyl) phosphate],
sodium-4,4'-dimethyl-5,6'-di-t-butyl-2,2'-biphenyl) phosphate],
calcium-bis[(4,4'-dimethyl-6,6'-di-t-butyl-2,2'-biphenyl) phosphate],
sodium-2,2'-ethylidene-bis(4-n-butyl-6-t-butylphenyl) phosphate],
sodium-2,2'-methylene-bis(4,6-di-methylphenyl) phosphate],
sodium-2,2'-methylene-bis(4,6-di-ethylphenyl)phosphate,
potassium-2,2'-ethylidene-bis(4,6-di-t-butylphenyl) phosphate,
calcium-bis[2,2'-ethylidene-bis(4,6-di-t-butylphenyl) phosphate],
magnesium-bis [2,2'-ethylidene-bis(4,6-di-t-butylphenyl) phosphate],
barium-bis [2,2'-ethylidene-bis (4,6-di-t-butylphenyl) phosphate],
aluminum-tris [2,2'-methylene-bis (4,6-di-t-butylphenyl) phosphate], and aluminum-tris [2,2'-ethylidene-bis (4,6-di-t-butylphenyl) phosphate], and further mixtures of two or more of these compounds.

Particularly, sodium-2,2'-methylene-bis(4,6-di-t-butylphenyl)phosphate is preferable.

Further examples of salts of aromatic phosphate may include:
sodium-bis(4-t-butylphenyl)phosphate,
sodium-bis(4-methylphenyl)phosphate,
sodium-bis(4-ethylphenyl)phosphate,
sodium-bis(4-i-propylphenyl)phosphate,
sodium-bis(4-t-octylphenyl)phosphate,
potassium-bis(4-t-butylphenyl)phosphate,
calcium-bis(4-t-butylphenyl)phosphate,
magnesium-bis(4-t-butylphenyl)phosphate,
lithium-bis(4-t-butylphenyl)phosphate, and
aluminum-bis(4-t-butylphenyl)phosphate, and mixtures thereof. Particularly, sodium-bis(4-t-butylphenyl)phosphate is preferable.

Examples of benzylidene sorbitol may include:
1,3,2,4-benzylidene sorbitol,
1,3-benzylidene-2,4-p-methyl benzylidene sorbitol,
1,3-benzylidene-2,4-p-ethyl benzylidene sorbitol,
1,3-p-methylbenzylidene-2,4-benzylidene sorbitol,
1,3-p-ethylbenzylidene-2,4-benzylidene sorbitol,
1,3-p-methylbenzylidene-2,4-p-ethyl benzylidene sorbitol,
1,3-p-ethylbenzylidene-2,4-p-methyl benzylidene sorbitol,
1,3,2,4-di(p-methyl benzylidene) sorbitol,
1,3,2,4-di(p-ethyl benzylidene) sorbitol,
1,3,2,4-di(p-n-propyl benzylidene) sorbitol,
1,3,2,4-di(p-1-propyl benzylidene) sorbitol,
1,3,2,4-di(p-n-butyl benzylidene) sorbitol,
1,3,2,4-di(p-s-butyl benzylidene) sorbitol,
1,3,2,4-di(p-t-butyl benzylidene) sorbitol,
1,3,2,4-di(2',4'-dimethyl benzylidene) sorbitol,
1,3,2,4-di(p-methoxy benzylidene) sorbitol,
1,3,2,4-di(p-ethoxy benzylidene) sorbitol,
1,3-benzylidene-2-4-p-chlorobenzylidene sorbitol,
1,3-p-chlorobenzylidene-2,4-benzylidene sorbitol,
1,3-p-chlorobenzylidene-2,4-p-methylbenzylidene sorbitol,
1,3-p-chlorobenzylidene-2,4-p-ethylbenzylidene sorbitol,
1,3-p-methylbenzylidene-2,4-p-chlorobenzylidene sorbitol,
1,3-p-ethylbenzylidene-2,4-p-chlorobenzylidene sorbitol, and 1,3,2,4-di(p-chlorobenzylidene) sorbitol, and further, mixtures of two or more of these compounds. Particularly, 1,3,2,4-dibenzylidene sorbitol, 1,3,2,4-di(p-methyl benzylidene)sorbitol, 1,3,2,4-di(p-ethyl benzylidene)sorbitol, 1,3-p-chlorobenzylidene-2,4-p-methylbenzylidene sorbitol, 1,3,2,4-di(p-chlorobenzylidene)sorbitol, and mixtures of two or more of these compounds are preferable.

Examples of the aromatic carboxylic acid may include aluminum hydroxy-di-para-t-butyl benzoate and the like.

Examples of the rosin type-crystalline nucleating agent may include metal salts of rosin acid, which are reaction products of a rosin acid and a metallic compound. Examples of rosin acid may include natural rosins such as gum rosin, tall oil rosin and wood rosin; various modified rosins such as disproportionated rosin, hydrogenated rosin, dehydrogenated rosin, polymerized rosin and α,β-ethylenic unsaturated carboxylic acid-modified rosin; purified products of the above natural rosins; and purified products of modified rosins. Examples of unsaturated carboxylic acids used in preparation of the above α,β-ethylenic unsaturated carboxylic acid-modified rosin are maleic acid, anhydrous maleic acid, fumaric acid, itaconic acid, anhydrous itaconic acid, citraconic acid, acrylic acid and methacrylic acid. Of these, at least one kind of rosins selected from natural rosins, modified rosins, and purified product of natural rosins and modified rosins is preferable. Here, the rosin acids include plural resin acids selected from pimaric acid, sandarach pimaric acid, palasitrin acid, isopimaric acid, abietic acid, dehydroabietic acid, necabietic acid, dihydropimaric acid, dihydroabietic acid and tetrahydroabietic acid.

The metallic compounds forming a metal salt by reaction with the above rosin acids are compounds having a metal element such as sodium, potassium and magnesium and capable of preparing a salt with the above rosin acids. Examples thereof may include chlorides, nitrates, acetates, sulfates, carbonates, oxides and hydroxides of the above metals.

Other examples of the crystalline nucleating agent may include polymers having a high melting point, metal salts of aromatic carboxylic acid or aliphatic carboxylic acid and inorganic compounds.

Examples of the polymers having a high melting point are polyvinyl cycloalkanes such as polyvinyl cyclohexane and polyvinyl cyclopentane, poly-3-methyl-1-pentene, poly-3-methyl-1-butene and poly-alkenyl silane.

The metal salts of aromatic carboxylic acid or aliphatic carboxylic acid may include aluminum benzoate, p-t-butyl-aluminum benzoate, sodium adipic acid, sodium thiophenecarboxylic acid and sodium pyrrole carboxylic acid.

The ethylene polymer-containing composition of the present invention has excellent moldability, so that it can be molded with calender molding, extrusion molding, injection molding, blow molding, press molding or stamping molding.

Stretched films are prepared by stretching the above extrusion sheet or extrusion film (un-stretched) with, for example, the tenter method (lengthwise and crosswise stretching, crosswise and lengthwise stretching), simultaneous biaxial stretching method or uni-axial stretching method. Further, inflation films can be also prepared.

Filaments can be prepared by, for example, extruding the molten composition through a spinning die. Further, filaments may be prepared by a melt blown method.

In the injection molding, the composition is molded into various shapes using conventionally known injection molding apparatus under known conditions. The composition containing the ethylene polymer of the present invention is easily subjected to injection molding, and has excellent rigidity, heat resistance, impact resistance, surface gloss, chemical resistance and wearing characteristics. Therefore, it can be used widely for trim materials for automobile interior, exterior materials for automobile, housing for household electric appliances and vessels.

In the blow molding, molding of the composition can be conducted using conventionally known blow molding apparatus under known conditions.

In the injection blow molding, the composition containing the ethylene polymer of the present invention is injected into a parison mold at a resin temperature of from 100° C. to 300° C. to mold a parison and then the parison is held in a desired shaped mold and fitted to the mold by blowing air, thereby effecting molding.

An example of press molding may include mold-stamping molding.

The ethylene polymer of the present invention can be used for various uses, for example, when it is used for the following uses such as (a) injection molded articles, (b) hollow or extrusion molded articles, (c) rotational molded articles, (d) film or sheet molded articles and (e) extrusion coating molded articles, molded articles having excellent mechanical strength such as tensile strength, tear strength or impact strength, heat resistance, stress crack resistance, optical properties or heat sealing properties can be prepared with high moldability.

In addition to the above uses, processes of adding a small amount of the ethylene polymer of the present invention as a modifier, moldability improver or the like to other thermoplastic resins are useful.

(a) Preferable uses of the injection molded articles are, for example, bottle containers, parts containers, agricultural and marine products containers, pallets, general merchandise goods, small-sized machine parts, industrial machine parts, caps, bottle inner stoppers, sealed vessel lids, pails or the like.

(b) Preferable uses of the hollow or extrusion molded articles are, for example, detergent bottles, cosmetic bottles, kerosene cans, industrial and medicine cans, drum cans, gasoline tanks, water pipes, gas pipes, sewerage pipes, large diameter pipes, general straight tubes, steel tube coverings, electric wire coverings, electric cable coverings, communication cable coverings, optical fiber spacers, electric wire protective coverings, ropes, fishing nets, cloth bags, food squeeze bottles, cosmetic tube cases or the like. Particularly preferable uses of the extrusion molded articles are covering molded articles, tubes and the like.

(c) Preferable uses of the rotational molded articles are, for example, medicine large-sized tanks, plating bathes, gasoline tanks, water tanks, purifier tanks, solar heater tanks and the like.

(d) Preferable uses of the film or sheet molded articles are, for example, food wrapping, machine tool wrapping, resistor packages, regular packages, inner packages, deposition films, multi-films, ski soles, food trays, stretch wrapping, shrink wrapping, agricultural films, heavy duty bags, liquid-transporting bags and the like.

(e) Preferable uses of the extrusion coating molded articles are, for example, milk cartons, wine and beverage cartons and the like.

Effect of the Invention

The first and second ethylene polymers of the present invention can be molded into various molded articles such as films, sheets or the like, and have a large $MFR_{10}/MFR_2$ ratio and excellent fluidity.

The third ethylene polymer of the present invention can be molded into various molded articles such as films, sheets or the like, and has excellent high-speed moldability.

The first process of preparing the ethylene polymer according to the present invention can produce ethylene polymers having excellent fluidity under relatively mild conditions.

The second process of preparing the ethylene polymer according to the present invention can produce ethylene polymers having excellent high-speed moldability under relatively mild conditions.

EXAMPLES

The present invention is described in more detail with reference to the following examples, but it is not limited with the examples.

Example 1

Synthesis of Ethylenebis(indenyl)hafnium dichloride

Into a 200 ml glass flask purged with nitrogen, 5.4 g of bis(indenyl)ethane (commercially available) and 50 ml of THF were charged and cooled to a temperature of from −30 to −40° C. with stirring. To the mixture, 31.5 ml of n-BuLi (1.6M solution) was added dropwise with continuous stirring at −30° C. for 1 hr, and anionic bis(indenyl)ethane was obtained by spontaneously elevating the temperature of the solution until room temperature. To another 200 ml glass flask purged with nitrogen, 60 ml of THF was charged and cooled at a temperature of not higher than −60° C., and thereto, 6.7 g of $HfCl_4$ (commercially available product: purity of 99.9%) was added gradually. Thereafter, the temperature of the mixture was elevated to 60° C., and the mixture was stirred for 1 hr. To the mixture, an anionic ligand was added dropwise and the mixture was stirred at 60° C. for 2 hr, and then, filtered with a glass filter. After this procedure, a solid was precipitated. The precipitated solid was filtered with a glass filter and then washed with hexane/diethylether and dried under reduced pressure to obtain ethylene bis(indenyl) hafnium dichloride.

(Polymerization)

To a 1000 ml glass flask thoroughly purged with nitrogen, 800 ml of decane was added and an ethylene gas was passed through at a rate of 100 l/hr. The temperature of a system was elevated to 95° C., and 0.076 mmol of N,N-dimethylanilinium tetrakis (pentafluorophenyl) borate, 0.8 mmol of triisobutyl aluminum and 0.016 mmol of ethylene bis(indenyl)hafnium dichloride were added and polymerization was started. The polymerization was carried out at atmospheric pressure at 100° C. for 15 min while feeding an ethylene gas continuously. A small amount of methanol was added to stop the polymerization, and the resulting polymerization solution was poured into a large amount of a mixed solution of methanol and acetone to precipitate a polymer. The precipitated polymer was dried at atmospheric pressure at 1000 C for 24 hr to obtain 12.1 g of a polymer having a density of 0.957 g/cm$^3$, [η] of 1.46 dl/g, Mw/Mn of 2.13, $MFR_2$ of 0.62 g/10 min and a $MFR_{10}/MFR_2$ ratio of 16.6.

Example 2

To a 500 ml glass flask thoroughly purged with nitrogen, 400 ml of toluene was charged and a mixed gas of ethylene and propylene was passed through (each at a rate of 80 l/hr and 20 l/hr). The temperature of a system was elevated to 55° C., and then 0.038 mmol of N,N-dimethylanilinium tetrakis (pentafluorophenyl)borate, 0.4 mmol of triisobutyl aluminum and 0.008 mmol of ethylene bis(indenyl)hafnium dichloride prepared in Example 1 were added and polymerization was started. The polymerization was carried out at atmospheric pressure at 60° C. for 15 min while feeding the above gas mixture continuously. A small amount of methanol was added to stop the polymerization, and the resulting polymerization solution was poured into a large amount of methanol to precipitate a polymer. The precipitated polymer was dried at atmospheric pressure at 80° C. for 12 hr to obtain 9.4 g of a polymer having a density of 0.865 g/cm$^3$, [η] of 1.60 dl/g, Mw/Mn of 2.08, $MFR_2$ of 0.09 g/10 min and a $MFR_{10}/MFR_2$ ratio of 21.7.

Example 3

To a 500 ml glass flask thoroughly purged with nitrogen, 400 ml of toluene and 9 ml of 1-octene were charged and an ethylene gas was passed through at a rate of 100 l/hr. The temperature of a system was elevated to 55° C., and then 0.038 mmol of N,N-dimethylanilinium tetrakis(pentafluorophenyl) borate, 0.4 mmol of triisobutyl aluminum and 0.008 mmol of ethylene bis(indenyl)hafnium dichloride prepared in Example 1 were added and polymerization was started. The polymerization was carried out at atmospheric pressure at 60° C. for 10 min while feeding the above gas continuously. The subsequent procedure was carried out in the same manner as Example 2 to obtain 14.5 g of a polymer having a density of 0.870 g/cm$^3$, [η] of 2.12 dl/g, Mw/Mn of 1.98, MFR$_2$ of 0.06 g/10 min and a MFR$_{10}$/MFR$_2$ ratio of 20.8.

Example 4

To a 500 ml glass flask thoroughly purged with nitrogen, 400 ml of toluene was charged and a mixed gas of ethylene and propylene (each at a rate of 75 l/hr and 25 l/hr) was passed through. The temperature of a system was elevated to 55° C., and then 0.038 mmol of triphenylcarbenium tetrakis (pentafluorophenyl) borate, 0.4 mmol of triisobutyl aluminum and 0.008 mmol of ethylene bis(indenyl)hafnium dichloride prepared in Example 1 were added and polymerization was started. The polymerization was carried out at atmospheric pressure at 60° C. for 10 min while feeding the above gas mixture continuously. The subsequent procedure was carried out in the same manner as Example 2 to obtain 13.7 g of a polymer having a density of 0.869 g/cm$^3$, [η] of 1.28 dl/g, Mw/Mn of 2.08, MFR$_2$ of 1.60 g/10 min and a MFR$_{10}$/MFR$_2$ ratio of 12.5.

Example 5

To a 500 ml glass flask thoroughly purged with nitrogen, 400 ml of toluene and 12 ml of 1-decene were charged and an ethylene was passed through at a rate of 100 l/hr. The temperature of a system was elevated to 55° C., and then 0.038 mmol of N,N-dimethylanilinium tetrakis(pentafluorophenyl) borate, 0.4 mmol of triisobutyl aluminum and 0.008 mmol of ethylene bis(indenyl)hafnium dichloride prepared in Example 1 were added and polymerization was started. The polymerization was carried out at atmospheric pressure at 60° C. for 10 min while feeding the above gas continuously. The subsequent procedure was carried out in the same manner as Example 2 to obtain 16.1 g of a polymer having a density of 0.867 g/cm$^3$, [η] of 2.00 dl/g, Mw/Mn of 2.18, MFR$_2$ of 0.18 g/10 min and a MFR$_{10}$/MFR$_2$ ratio of 22.7.

Example 6

To a 500 ml glass flask thoroughly purged with nitrogen, 400 ml of toluene was charged and a mixed gas of ethylene and propylene (each at a rate of 75 l/hr and 25 l/hr) was passed through. The temperature of a system was elevated to 55° C., and then 0.038 mmol of N,N-dimethylanilinium tetrakis (pentafluorophenyl) borate, 0.4 mmol of triisobutyl aluminum and 0.008 mmol of ethylene bis(indenyl)hafnium dichloride prepared in Example 1 were added and polymerization was started. The polymerization was carried out at atmospheric pressure at 60° C. for 10 min while feeding the above gas mixture continuously. The subsequent procedure was carried out in the same manner as Example 2 to obtain 13.2 g of a polymer having a density of 0.866 g/cm$^3$, [η] of 1.70 dl/g, Mw/Mn of 2.10, MFR$_2$ of 0.36 g/10 min and a MFR$_{10}$/MFR$_2$ ratio of 15.8. The resulting polymer had a ω2/ω1 value of 20.6.

Example 7

To a 1000 ml glass flask thoroughly purged with nitrogen, 800 ml of toluene and 2 ml of 1-decene were charged and an ethylene was passed through at a rate of 100 l/hr. The temperature of a system was elevated to 75° C., and then 0.076 mmol of N,N-dimethylanilinium tetrakis(pentafluorophenyl) borate, 0.32 mmol of triisobutyl aluminum and 0.016 mmol of ethylene bis(indenyl)hafnium dichloride prepared in Example 1 is were added and polymerization was started. The polymerization was carried out at atmospheric pressure at 80° C. for 10 min while feeding the above gas continuously. The subsequent procedure was carried out in the same manner as Example 2 to obtain 21.4 g of a polymer having a density of 0.935 g/cm$^3$, [η] of 2.00 dl/g, Mw/Mn of 2.20, MFR$_2$ of 0.11 g/10 min and a MFR$_{10}$/MFR$_2$ ratio of 21.5.

Example 8

To a 1000 ml glass flask thoroughly purged with nitrogen, 800 ml of toluene and 4 ml of 1-decene were charged and an ethylene was passed through at a rate of 100 l/hr. The temperature of a system was elevated to 75° C., and then 0.076 mmol of N,N-dimethylanilinium tetrakis(pentafluorophenyl) borate, 0.32 mmol of triisobutyl aluminum and 0.016 mmol of ethylene bis(indenyl)hafnium dichloride prepared in Example 1 were added and polymerization was started. The polymerization was carried out at atmospheric pressure at 80° C. for 15 min while feeding the above gas continuously. The subsequent procedure was carried out in the same manner as Example 2 to obtain 26.8 g of a polymer having a density of 0.930 g/cm$^3$, [η] of 1.74 dl/g, Mw/Mn of 2.21, MFR$_2$ of 0.19 g/10 min and a MFR$_{10}$/MFR$_2$ ratio of 18.8.

Example 9

To a 500 ml glass flask thoroughly purged with nitrogen, 400 ml of toluene was charged and an ethylene was passed through at a rate of 100 l/hr. The temperature of a system was elevated to 75° C., and then 0.038 mmol of N,N-dimethylanilinium tetrakis(pentafluorophenyl) borate, 0.20 mmol of triisobutyl aluminum and 0.008 mmol of ethylene bis(indenyl)hafnium dichloride prepared in Example 1 were added and polymerization was started. The polymerization was carried out at atmospheric pressure at 80° C. for 10 min while feeding the above gas continuously. The subsequent procedure was carried out in the same manner as Example 2 to obtain 38.1 g of a polymer having a density of 0.954 g/cm$^3$, [η] of 1.43 dl/g, Mw/Mn of 2.95, MFR$_2$ of 0.12 g/10 min and a MFR$_{10}$/MFR$_2$ ratio of 25.5.

Example 10

To a 1000 ml glass flask thoroughly purged with nitrogen, 800 ml of toluene and 2 ml of 1-hexene were charged and an ethylene gas was passed through at a rate of 100 l/hr. The temperature of a system was elevated to 45° C., and then 0.076 mmol of N,N-dimethylanilinium tetrakis(pentafluorophenyl) borate, 0.8 mmol of triisobutyl aluminum and 0.016 mmol of ethylene bis(indenyl)hafnium dichloride prepared in Example 1 were added and polymerization was started. The polymerization was carried out at atmospheric pressure at 50° C. for 10 min while feeding the above gas continuously. The subsequent procedure was carried out in the same manner as Example 2 to obtain 14.5 g of a polymer having a density of 0.927 g/cm$^3$, Mw/Mn of 2.25, MFR$_2$ of 0.04 g/10 min and a MFR$_{10}$/MFR$_2$ ratio of 17.0.

Comparative Example 1

An ethylene and propylene copolymer having a density of 0.867 g/cm$^3$, [η] of 1.70 dl/g, Mw/Mn of 1.91 and MFR$_2$ of 0.87 g/10 min (which was synthesized at an ethylene and propylene feeding ratio of 75:25 in a catalyst system of ethylene bis(indenyl) hafnium dichloride and methylaluminoxane) had a $MFR_{10}/MFR_2$ ratio of 9.31.

Comparative Example 2

To a 500 ml glass flask thoroughly purged with nitrogen, 400 ml of toluene was charged and a mixed gas of ethylene and propylene (each at a rate of 75 l/hr and 25 l/hr) was passed through. The temperature of a system was elevated to 55° C., and then 0.038 mmol of N,N-dimethylanilinium tetrakis(pentafluoro phenyl)borate, 0.4 mmol of triisobutyl aluminum and 0.008 mmol of ethylene bis(indenyl)zirconium dichloride were added and polymerization was started. The polymerization was carried out at atmospheric pressure at 60° C. for 10 min while feeding the above gas mixture continuously. The subsequent procedure was carried out in the same manner as Example 2 to obtain 21.7 g of a polymer having a density of 0.859 g/cm³, [η] of 0.68 dl/g, $MFR_2$ of 91.0 g/10 min and a $MFR_{10}/MFR_2$ ratio of 7.8.

Comparative Example 3

To a 500 ml glass flask thoroughly purged with nitrogen, 400 ml of toluene was charged and a mixed gas of ethylene and propylene (each at a rate of 75 l/hr and 25 l/hr) was passed through. The temperature of a system was elevated to 55° C., and then 2.0 mmol of methylaluminoxane and 0.008 mmol of [(N-t-butyldimethyl-tetramethyl cyclopentadienyl)silanaminate] dichlorotitanium were added and polymerization was started. The polymerization was carried out at atmospheric pressure at 60° C. for 10 min while feeding the above gas mixture continuously. The subsequent procedure was carried out in the same manner as Example 2 to obtain 9.4 g of a polymer having a density of 0.859 g/cm³, [η] of 3.1 dl/g, $MFR_2$ of 0.14 g/10 min and a $MFR_{10}/MFR_2$ ratio of 6.7.

Comparative Example 4

Afinity 1845™ manufactured by Dow Co. was measured as an ethylene polymer. It had a $MFR_{10}/MFR_2$ ratio of 8.5 and a $\omega 2/\omega 1$ ratio of 8.3.

The invention claimed is:

1. A process for preparing an ethylene polymer, which process comprises preparing said ethylene polymer in the presence of an olefin polymerization catalyst comprising an organic hafnium compound selected from the group consisting of ethylene bis(indenyl)dimethyl hafnium, ethylene bis(indenyl)diethyl hafnium, ethylene bis(indenyl)diphenyl hafnium, ethylene bis(indenyl)methyl hafnium monochloride, ethylene bis(indenyl)ethyl hafnium monochloride, ethylene bis(indenyl)methyl hafnium monobromide, ethylene bis(indenyl) hafnium dichloride, ethylene bis(indenyl) hafnium dibromide, ethylene bis(4,5,6,7-tetrahydro-1-indenyl)dimethyl hafnium, ethylene bis(4,5,6,7-tetrahydro-1indenyl)methyl hafnium monochloride, ethylene bis(4,5,6,7-tetrahydro-1-indenyl)hafnium dichloride, ethylene bis(4,5,6,7-tetrahydro-1-indenyl)hafnium dibromide, ethylene bis(4-methyl-1-indenyl)hafnium dichloride, ethylene bis(5-methyl-1-indenyl)hafnium dichloride, ethylene bis(6-methyl-1-indenyl)hafnium dichloride, ethylene bis(7-methyl-1-indenyl)hafnium dichloride, ethylene bis(5-methoxy-1-indenyl)hafnium dichloride, ethylene bis(2,3-dimethyl-1-indenyl)hafnium dichloride, ethylene bis(4,7-dimethyl-1-indenyl)hafnium dichloride and ethylene bis(4,7-dimethoxy-1-indenyl)hafnium dichloride, and an organic boron compound as indispensable components and under a polymerization temperature of 50 to 100° C., wherein the ethylene polymer has:

(A) a density of from 0.930 to 0.970 g/cm³, (B) a ratio (Mw/Mn) of a weight average molecular weight (Mw) to a number average molecular weight (Mn), as measured by GPC, of from 1.2 to 10, and (C) a ratio ($MFR_{10}/MFR_2$) of a melt flow rate ($MFR_{10}$) at 190° C. under a load of 10 Kg to a melt flow rate ($MFR_2$) at 190° C. under a load of 2.16 Kg of from 16.2 to 50.

* * * * *